United States Patent
Kang et al.

(10) Patent No.: US 11,530,283 B2
(45) Date of Patent: Dec. 20, 2022

(54) LAMINATE

(71) Applicant: LG Chem, Ltd., Seoul (KR)

(72) Inventors: Na Na Kang, Daejeon (KR); Se Jin Ku, Daejeon (KR); Mi Sook Lee, Daejeon (KR); Eung Chang Lee, Daejeon (KR); Eun Young Choi, Daejeon (KR); Sung Soo Yoon, Daejeon (KR); No Jin Park, Daejeon (KR); Je Gwon Lee, Daejeon (KR); Hyung Ju Ryu, Daejeon (KR); Yoon Hyung Hur, Daejeon (KR)

(73) Assignee: LG Chem, Ltd.

( * ) Notice: Subject to any disclaimer, the term of this patent is extended or adjusted under 35 U.S.C. 154(b) by 392 days.

(21) Appl. No.: 16/646,788

(22) PCT Filed: Sep. 17, 2018

(86) PCT No.: PCT/KR2018/010894
§ 371 (c)(1),
(2) Date: Mar. 12, 2020

(87) PCT Pub. No.: WO2019/054814
PCT Pub. Date: Mar. 21, 2019

(65) Prior Publication Data
US 2020/0254714 A1      Aug. 13, 2020

(30) Foreign Application Priority Data
Sep. 15, 2017   (KR) .......................... 10-2017-0118723

(51) Int. Cl.
*C08F 220/20*    (2006.01)
*C08F 220/32*    (2006.01)
(Continued)

(52) U.S. Cl.
CPC .............. *C08F 212/20* (2020.02); *B32B 3/14* (2013.01); *B32B 27/28* (2013.01);
(Continued)

(58) Field of Classification Search
CPC .. C08F 212/20; C08F 220/325; C08F 220/20; C08F 220/301; C08F 2438/03;
(Continued)

(56) References Cited

U.S. PATENT DOCUMENTS 5,391,626 A     2/1995  Machida et al.
8,853,101 B1   10/2014  Farrell et al.
(Continued)

FOREIGN PATENT DOCUMENTS

CN      102566261 A     7/2012
CN      103717626 A     4/2014
(Continued)

OTHER PUBLICATIONS

Park et al., "Block Copolymer Lithography:Periodic Arrays of -10 11 Holes in 1 Square Centimeter", Science 276, 1401, accepted Apr. 1, 1997, 6 pages.
(Continued)

*Primary Examiner* — Michael M. Bernshteyn
(74) *Attorney, Agent, or Firm* — Lerner, David, Littenberg, Krumholz & Mentlik, LLP

(57) ABSTRACT

A laminate and a method for producing a patterned substrate using the same are disclosed herein. In some embodiments, a laminate includes a substrate, and a stripe pattern having first and second polymer lines alternately and repeatedly disposed on the substrate, wherein the first polymer line comprises a first polymer having a first polymerized unit having a ring structure connected to a main chain and a second polymerized unit represented by Formula 1. The method may be applied to manufacture of devices, such as
(Continued)

electronic devices, or of applications, such as integrated optical systems, guidance and detection patterns of magnetic domain memories, flat panel displays, liquid crystal displays (LCDs), thin film magnetic heads or organic light emitting diodes, and may be used to build a pattern on a surface used in manufacture of discrete track media, such as integrated circuits, bit-patterned media and/or magnetic storage devices such as hard drives.

14 Claims, 4 Drawing Sheets

(51) Int. Cl.
  *B32B 3/14* (2006.01)
  *B32B 27/28* (2006.01)
  *B32B 38/00* (2006.01)
  *C08F 220/30* (2006.01)
  *C08F 212/14* (2006.01)

(52) U.S. Cl.
  CPC ...... *B32B 38/0008* (2013.01); *B32B 38/0036* (2013.01); *C08F 220/20* (2013.01); *C08F 220/301* (2020.02); *C08F 220/325* (2020.02); *B32B 2038/0048* (2013.01); *B32B 2305/72* (2013.01); *B32B 2310/0881* (2013.01); *B32B 2310/14* (2013.01); *B32B 2457/14* (2013.01); *C08F 2438/03* (2013.01)

(58) Field of Classification Search
  CPC ....... B32B 3/14; B32B 27/38; B32B 38/0008; B32B 38/0036; B32B 2038/0048; B32B 2305/72; B32B 2310/0881; B32B 2310/14; B32B 2457/14
  USPC ........................................................ 428/201
  See application file for complete search history.

(56) References Cited

U.S. PATENT DOCUMENTS

| | | | |
|---|---|---|---|
| 10,287,430 B2 * | 5/2019 | Ku | C08J 5/18 |
| 2011/0186544 A1 | 8/2011 | Endou et al. | |
| 2012/0088192 A1 | 4/2012 | Trefonas et al. | |
| 2012/0214094 A1 * | 8/2012 | Mikoshiba | H01L 21/0337 438/689 |
| 2013/0030077 A1 | 1/2013 | Kim et al. | |
| 2014/0004712 A1 | 1/2014 | Chen et al. | |
| 2014/0335324 A1 | 11/2014 | Kim et al. | |
| 2015/0093912 A1 | 4/2015 | Wu et al. | |
| 2015/0166821 A1 | 6/2015 | Yi et al. | |
| 2015/0184017 A1 | 7/2015 | Hustad et al. | |
| 2015/0311442 A1 | 10/2015 | Seino et al. | |
| 2016/0244557 A1 | 8/2016 | Vora et al. | |
| 2016/0276149 A1 | 9/2016 | Smith | |
| 2016/0280831 A1 * | 9/2016 | Park | C08F 293/005 |
| 2016/0280832 A1 | 9/2016 | Kim et al. | |
| 2016/0304653 A1 | 10/2016 | Kim et al. | |
| 2016/0304740 A1 | 10/2016 | Cheng et al. | |
| 2016/0311960 A1 | 10/2016 | Lee et al. | |
| 2017/0219922 A1 * | 8/2017 | Ku | C08F 32/06 |

FOREIGN PATENT DOCUMENTS

| | | |
|---|---|---|
| CN | 104335079 A | 2/2015 |
| CN | 104749876 A | 7/2015 |
| CN | 105324716 A | 2/2016 |
| CN | 105555815 A | 5/2016 |
| CN | 105742161 A | 7/2016 |
| CN | 105980342 A | 9/2016 |
| JP | 2012078830 A | 4/2012 |
| JP | 2012174984 A | 9/2012 |
| JP | 2015181995 A | 10/2015 |
| JP | 2016533402 A | 10/2016 |
| JP | 2016539237 A | 12/2016 |
| JP | 2017513032 A | 5/2017 |
| KR | 101343760 B1 | 12/2013 |
| KR | 20150066487 A | 6/2015 |
| KR | 20150067074 A | 6/2015 |
| KR | 20160038707 A | 4/2016 |
| KR | 20160061971 A | 6/2016 |
| KR | 20160138760 A | 12/2016 |

OTHER PUBLICATIONS

Search report from International Application No. PCT/KR2018/010894, dated Jan. 2, 2019, 3 pages.

Chinese Search Report for Application No. 201880059350.1, dated Jun. 18, 2021, 3 pages.

* cited by examiner

[Figure 1]
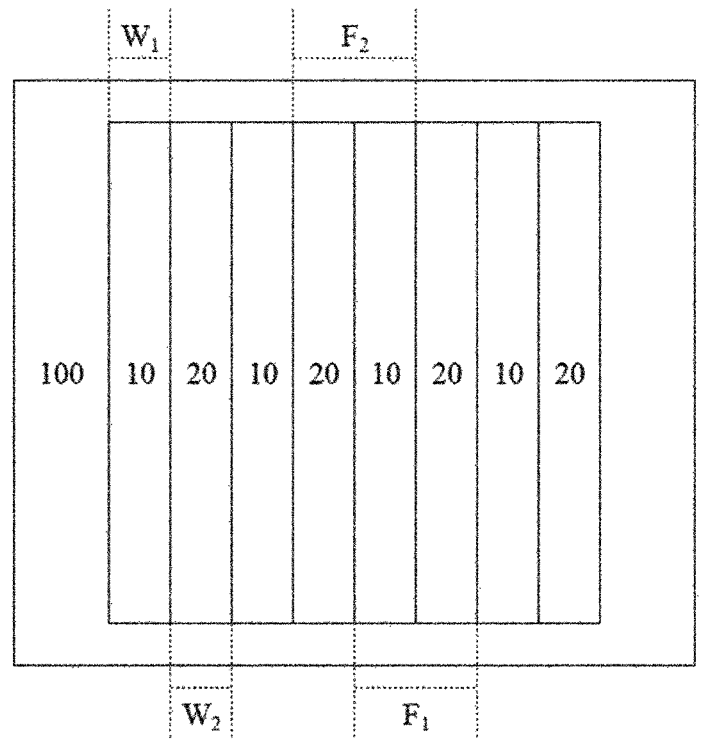
[Figure 2]
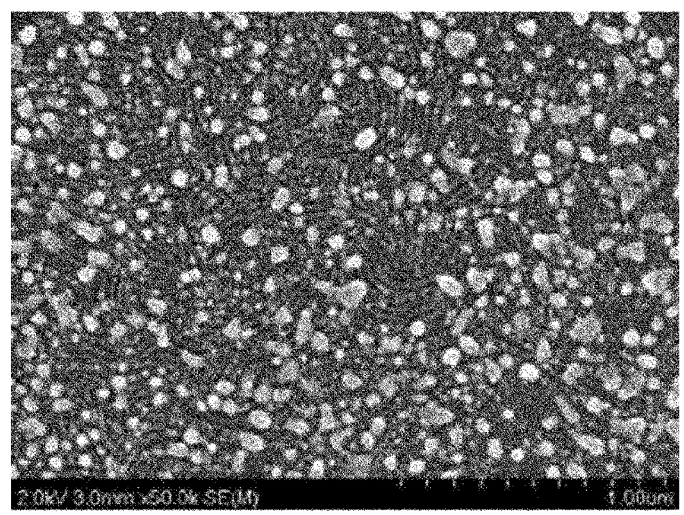

[Figure 3]
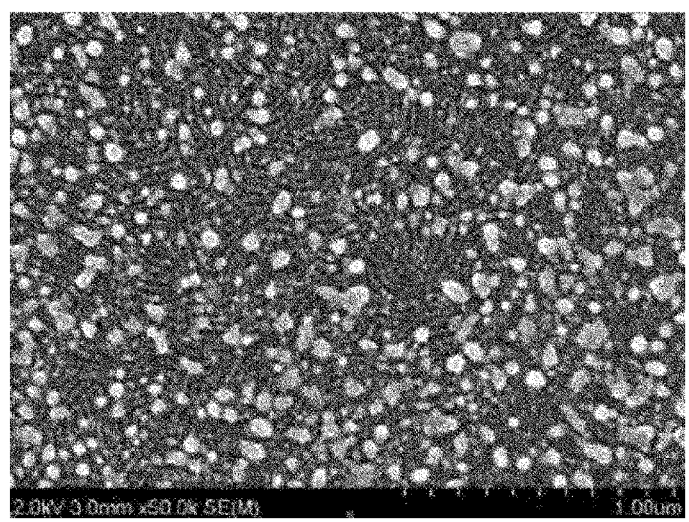
[Figure 4]
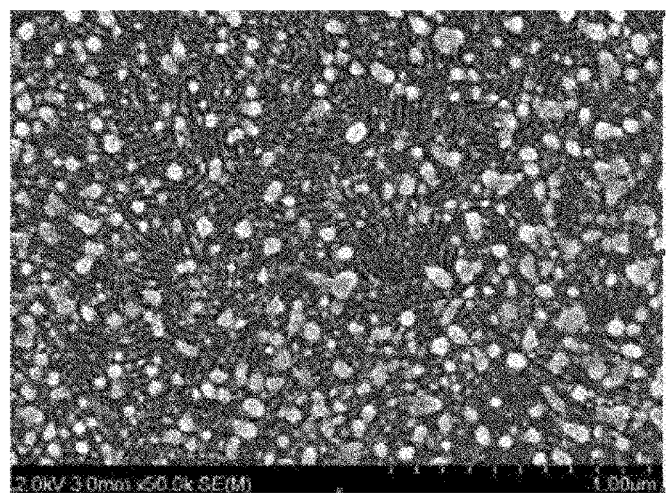

[Figure 5]
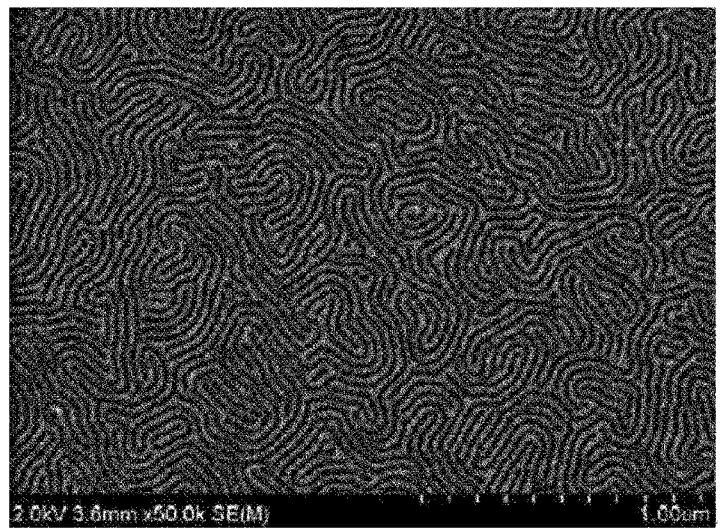
[Figure 6]
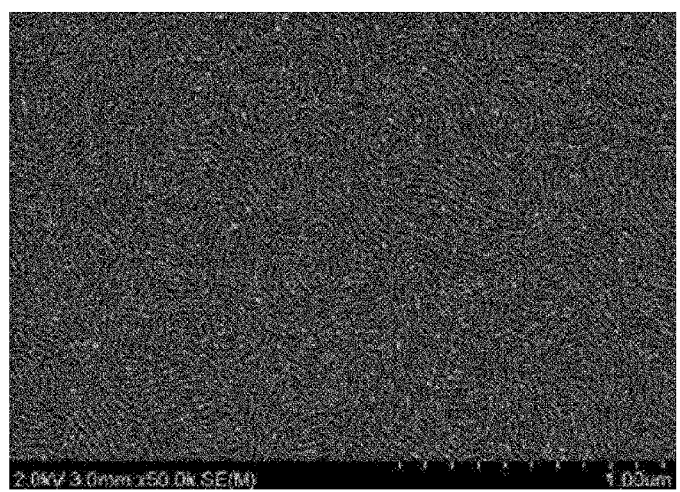

[Figure 7]
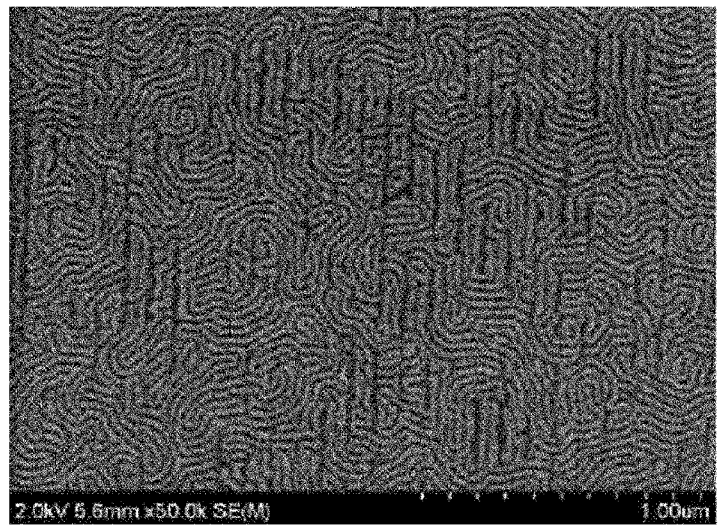
[Figure 8]
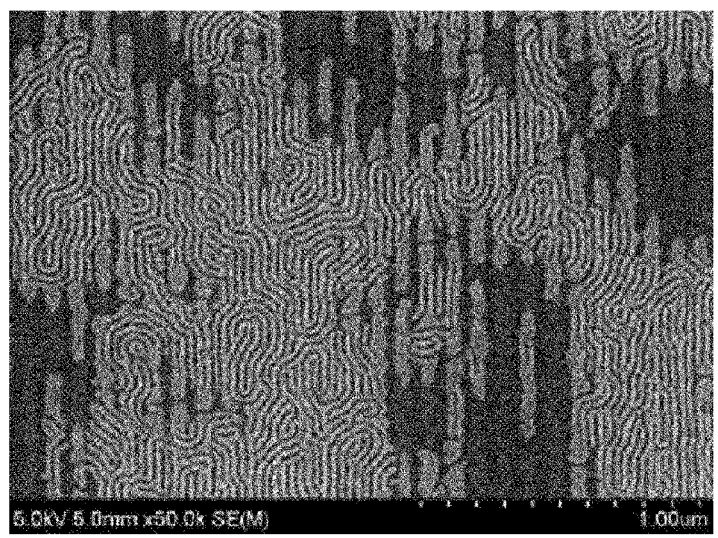

LAMINATE

CROSS-REFERENCE TO RELATED APPLICATION(S)

The present application is a national phase entry under 35 U.S.C. § 371 of International Application No. PCT/KR2018/010894, filed on Sep. 17, 2018, which claims priority from Korean Patent Application No. 10-2017-0118723, filed on Sep. 15, 2017, the disclosures of which are incorporated by reference herein.

TECHNICAL FIELD

The present application relates to a laminate.

BACKGROUND ART

A block copolymer is a copolymer in which polymer blocks having different chemical structures are linked via covalent bonds. Such a block copolymer can form a periodically arranged structure such as a sphere, a cylinder or a lamella by phase separation. The shape and size of the domain of the structure formed by a self-assembly phenomenon of the block copolymer can be extensively controlled by, for example, the kind of the monomer forming each block or the relative ratio between the blocks, and the like.

Due to such a characteristic, the block copolymer is being considered for application to nanowire fabrication, fabrication of next-generation nano elements such as quantum dots or metal dots or a lithography method capable of forming a high-density pattern on a predetermined substrate, and the like (see, for example, Non-Patent Document 1, etc.).

The technique of adjusting orientation of the self-assembled structure of the block copolymer horizontally or vertically on various substrates occupies a very large proportion in practical application of the block copolymer. Typically, the orientation of nanostructures in the film of the block copolymer is determined by which block of the block copolymer is exposed to the surface or air. In general, since a number of substrates have polarity and air is non-polar, a block having a larger polarity among the blocks of the block copolymer is wetted to the substrate, and a block having a smaller polarity is wetted at the interface with air. Accordingly, various techniques have been proposed to allow the blocks having different characteristics of the block copolymer to be simultaneously wetted on the substrate side, and the most representative technique is adjustment of orientation applying neutral surface preparation.

On the other hand, what is important in the application of the lithography method of forming a pattern on a substrate by using a block copolymer is to secure linearity of a pattern (e.g., a lamellar pattern) of a self-assembled block copolymer.

PRIOR ART DOCUMENTS

Non-Patent Documents (Non-Patent Document 1) Chaikin and Register. et al., Science 276, 1401 (1997)

BRIEF DESCRIPTION OF DRAWINGS

FIG. 1 is an exemplary diagram of a stripe pattern on a substrate on which a block copolymer is formed.

FIGS. 2 to 6 are SEM (scanning electron microscope) images for Test Examples or Comparative Test Examples.

FIG. 7 is an image of the result of Example 1.

FIG. 8 is an image of the result of Comparative Example 1.

DISCLOSURE

Technical Problem

The present application provides a method for producing a laminate. It is one object of the present application to provide a laminate in which a self-assembly pattern of a block copolymer which is vertically oriented and has excellent linearity can be effectively formed.

Technical Solution

In this specification, the term monovalent or divalent hydrocarbon group may mean a monovalent or divalent residue derived from a compound composed of carbon and hydrogen or a derivative thereof, unless otherwise specified. Here, the compound composed of carbon and hydrogen can be exemplified by alkane, alkene, alkyne, alicyclic hydrocarbon or aromatic hydrocarbon.

In this specification, the term alkyl group may mean an alkyl group having 1 to 20 carbon atoms, 1 to 16 carbon atoms, 1 to 12 carbon atoms, 1 to 8 carbon atoms or 1 to 4 carbon atoms, unless otherwise specified. The alkyl group may be a linear, branched or cyclic alkyl group, which may be optionally substituted by one or more substituents.

In this specification, the term alkoxy group may mean an alkoxy group having 1 to 20 carbon atoms, 1 to 16 carbon atoms, 1 to 12 carbon atoms, 1 to 8 carbon atoms or 1 to 4 carbon atoms, unless otherwise specified. The alkoxy group may be a linear, branched or cyclic alkoxy group, which may be optionally substituted by one or more substituents.

The term alkenyl group or alkynyl group herein means an alkenyl group or alkynyl group having 2 to 20 carbon atoms, 2 to 16 carbon atoms, 2 to 12 carbon atoms, 2 to 8 carbon atoms or 2 to 4 carbon atoms, unless otherwise specified. The alkenyl or alkynyl group may be linear, branched or cyclic, which may be optionally substituted by one or more substituents.

The term alkylene group herein may mean an alkylene group having 1 to 20 carbon atoms, 1 to 16 carbon atoms, 1 to 12 carbon atoms, 1 to 8 carbon atoms or 1 to 4 carbon atoms, unless otherwise specified. The alkylene group may be a linear, branched or cyclic alkylene group, which may be optionally substituted by one or more substituents.

The term oxyalkylene group herein may mean a divalent group in which an oxygen atom is directly bonded to an alkylene group. The alkylene group may be the above-mentioned alkylene group.

The term alkenylene group or alkynylene group herein may mean an alkenylene group or alkynylene group having 2 to 20 carbon atoms, 2 to 16 carbon atoms, 2 to 12 carbon atoms, 2 to 8 carbon atoms or 2 to 4 carbon atoms. The alkenylene group or alkynylene group may be linear, branched or cyclic, which may be optionally substituted by one or more substituents.

The term aryl group or arylene group herein may mean, unless otherwise specified, a monovalent residue or divalent residue derived from a compound comprising one benzene structure, or a structure in which two or more benzene rings are linked while sharing one or two carbon atoms, or linked by any linker, or a derivative thereof. The aryl group or arylene group may be, for example, an aryl or arylene group having 6 to 30 carbon atoms, 6 to 25 carbon atoms, 6 to 21 carbon atoms, 6 to 18 carbon atoms, 6 to 13 carbon atoms or 6 to 12 carbon atoms, unless otherwise specified.

In the present application, the term aromatic structure may mean the aryl group or arylene group.

The term alicyclic structure means a cyclic hydrocarbon structure other than an aromatic ring structure, unless otherwise specified. For example, a cycloalkane, cycloalkene, or cycloalkyne structure, and the like can be exemplified. The alicyclic structure may be, for example, an alicyclic structure having 3 to 30 carbon atoms, 3 to 25 carbon atoms, 3 to 21 carbon atoms, 3 to 18 carbon atoms or 3 to 13 carbon atoms, unless otherwise specified.

In the present application, the term single bond may mean a case where no separate atom is present at the relevant site. For example, in the structure represented by A-B-C, when B is a single bond, no separate atom exists at the site represented by B, and A and C are directly connected, so that it may mean to form a structure represented by A-C.

In the present application, the substituent, with which the alkyl group, alkenyl group, alkynyl group, alkylene group, alkenylene group, alkynylene group, alkoxy group, aryl group, arylene group, chain or aromatic structure, and the like may be optionally substituted, may be exemplified by a hydroxy group, a halogen atom, a carboxyl group, a glycidyl group, an acryloyl group, a methacryloyl group, an acryloyloxy group, a methacryloyloxy group, a thiol group, an alkyl group, an alkenyl group, an alkynyl group, an alkylene group, an alkenylene group, an alkynylene group, an alkoxy group or an aryl group, and the like, but is not limited thereto.

The above-mentioned contents apply equally to this specification, unless otherwise stated for particular exceptions.

Among physical properties mentioned in the present application, physical properties that may vary with temperatures are values measured at room temperature, unless otherwise specified. The term room temperature is a natural temperature without warming or cooling, which may mean a temperature of about 10° C. to 30° C., about 25° C. or about 23° C.

The present application relates to a laminate. The laminate may comprise a substrate and a stripe pattern formed on the substrate. In one example, the laminate can be applied to a method for producing a patterned substrate. In one example, the production method may be performed by a lithography method in which a directed self-assembly material is applied as a template. Here, the directed self-assembly material may be a block copolymer.

The laminate of the present application or the production method of a patterned substrate applying the same may be applied to a process of manufacturing devices such as, for example, electronic devices and integrated circuits, or other applications, such as manufacture of integrated optical systems, guidance and detection patterns of magnetic domain memories, flat panel displays, liquid crystal displays (LCDs), thin film magnetic heads or organic light emitting diodes, and the like. The method may also be used to build a pattern on a surface used in manufacture of discrete track media, such as integrated circuits, bit-patterned media and/ or magnetic storage devices such as hard drives.

The laminate of the present application may have a substrate and a stripe pattern formed on the substrate.

The type of the substrate, to which the method of the present application is applied, is not particularly limited. As the substrate, for example, various types of substrates requiring formation of a pattern on the surface may be used for application to each of the above-described applications. This type of substrate may include, for example, a silicon substrate, a silicon germanium substrate, a GaAs substrate, a silicon oxide substrate, and the like. As the substrate, for example, a substrate applied to formation of finFETs (fin field effect transistors) or other electronic devices such as diodes, transistors or capacitors may be used. In addition, other materials such as ceramics may be used as the substrate depending on the application, and the types of substrates that can be applied in the present application are not limited thereto.

The stripe pattern formed on the substrate may be formed by including first polymer lines and second polymer lines which are formed alternately and repeatedly.

An example of such a stripe pattern is shown in FIG. 1. As shown in FIG. 1, the stripe pattern of the present application may be a pattern in which the first polymer lines (10) and the second polymer lines (20) are embodied alternately and repeatedly on the substrate (100). The first and second polymer lines (10, 20) may be formed in contact with each other as in the drawing. Here, the polymer lines (10, 20) may mean a line form formed by using each polymer.

The stripe pattern exemplarily shown in FIG. 1 is a case where the relevant pattern is observed from above. Such a pattern may be formed in various ways. For example, a shape as shown in FIG. 1 can also be confirmed by first forming a polymer membrane composed of the first polymer pattern (10) on the substrate (100) entirely and then forming the second polymer pattern (20) as a line pattern thereon, or by first forming a polymer membrane composed of the second polymer pattern (20) on the substrate (100) entirely and then forming the first polymer pattern (10) as a line pattern thereon, and in another example, a shape as shown in FIG. 1 can also be shown by disposing the first and second polymer lines (10, 20), each of which is a line form, repeatedly and alternately.

In one example, the first polymer line may be a line forming a so-called pinning layer and the second polymer line may be a line forming a so-called neutral layer.

The terms pinning layer and neutral layer have meaning based on meaning known in the field of applying a block copolymer to form a self-assembly structure. Generally, the pinning layer is a layer that provides a surface formed to exhibit higher affinity for one block of the block copolymer than the other block, and the neutral layer is a layer that provides a surface formed to exhibit similar affinity for all blocks of the block copolymer. It is generally known that the block copolymer has a strong tendency to perform a so-called horizontal orientation on the pinning layer and a strong tendency to perform a so-called vertical orientation on the neutral layer.

Here, the horizontal orientation is a state where the interface between both blocks of the block copolymer in the self-assembled state is horizontal to the substrate or the pinning layer, which may mean, for example, an orientation that any block of the block copolymer is mainly in contact with the pinning layer or the substrate, and the vertical orientation is a state where the interface between both blocks of the block copolymer in the self-assembled state is perpendicular to the substrate or the neutral layer, which may mean, for example, an orientation that all the blocks of the block copolymer are similarly in contact with the neutral layer or the substrate.

Here, the first polymer line may comprise a first polymer having a first polymerized unit with a ring structure connected to the main chain and a second polymerized unit represented by Formula 1 below which is described below.

Such a first polymer may be a random copolymer containing at least the first and second polymerized units.

The ring structure in the first polymerized unit may be the aromatic structure or alicyclic structure as described above.

Such a ring structure may be directly connected to the main chain of the first polymerized unit, or may be connected via an appropriate linker. For example, if the aromatic ring structure is a benzene structure and such a ring structure is directly connected to the main chain, a styrene structure can be realized.

Here, the linker connecting the ring structure to the main chain can be exemplified by an oxygen atom, a sulfur atom, —NR$_1$—, S(=O)$_2$—, a carbonyl group, an alkylene group, an alkenylene group, an alkynylene group, —C(=O)—X$_1$— or —X$_1$—C(=O)—, and the like. Here, R$_1$ may be hydrogen, an alkyl group, an alkenyl group, an alkynyl group, an alkoxy group or an aryl group, and X$_1$ may be a single bond, an oxygen atom, a sulfur atom, —NR$_2$—, —S(=O)$_2$—, an alkylene group, an alkenylene group or an alkynylene group. Here, R$_2$ may be hydrogen, an alkyl group, an alkenyl group, an alkynyl group, an alkoxy group or an aryl group.

In one example, the ring structure of the first polymerized unit may comprise one or more halogen atoms. Such a first polymerized unit herein may also be referred to as a first A polymerized unit. Such a halogen atom may be a form substituted in the ring structure or a form contained in a functional group substituted in the ring structure. In this case, the ring structure may be the aromatic structure. Also, in this case, the ring structure may be directly connected to the main chain. Here, the halogen atom contained in the ring structure can be exemplified by fluorine or chlorine, and the like.

In one example, the ring structure of the first polymerized unit may be connected by a chain having 8 or more chain-forming atoms. Such a first polymerized unit herein may also be referred to as a first B polymerized unit. Such a chain may be directly connected to the ring structure, or may be connected via an appropriate linker. In this case, the ring structure may be the aromatic structure. Also, in this case, the ring structure may be directly connected to the main chain or may be connected via the above-mentioned linker. The appropriate linker can be exemplified by an oxygen atom, a sulfur atom, a carbonyl group, —C(=O)—O— or —O—C(=O)—, but is not limited thereto and all the above-mentioned linkers can be applied.

In this specification, the term chain-forming atom means an atom forming a linear structure of a predetermined chain. That is, the chain may be linear or branched, but the number of chain-forming atoms is calculated by only the number of atoms forming the longest linear chain and other atoms bonded to the chain-forming atoms (for example, if the chain-forming atoms are carbon atoms, hydrogen atoms bonding to the carbon atoms and the like) are not calculated. The kind of chain forming atom does not include a hydrogen atom. Thus, hydrogen atoms, even when present, are not counted as chain-forming atoms. In the case of a branched chain, the number of chain-forming atoms can be calculated as the number of chain-forming atoms forming the longest chain. For example, when the chain is an n-pentyl group, all of the chain-forming atoms are carbon, where the number is 5, and even if the chain is a 2-methylpentyl group, all of the chain-forming atoms are carbon, where the number is 5. The chain-forming atom may be exemplified by carbon, oxygen, sulfur or nitrogen, and the like, and an appropriate chain-forming atom may be carbon, oxygen or nitrogen, or may be carbon or oxygen. The number of chain-forming atoms may be 8 or more, 9 or more, 10 or more, 11 or more, or 12 or more. The number of the chain forming atoms may also be 30 or less, 25 or less, 20 or less, 16 or less, or 14 or less.

In one example, the chain may be a hydrocarbon chain. Such a hydrocarbon chain may contain as many carbon atoms as the number of chain-forming atoms as mentioned above. Also, the hydrocarbon chain may contain, in some cases, an oxygen atom or a nitrogen atom as a heteroatom for the carbon atom, and may not contain the heteroatom. In another example, the carbon number of the hydrocarbon chain may be 8 or more, 9 or more, 10 or more, 11 or more, or 12 or more, or may also be 20 or less, 19 or less, 18 or less, 17 or less, 16 or less, 15 or less, 14 or less, 13 or less, or 12 or less. The hydrocarbon chain may be a linear hydrocarbon chain, and may be, for example, a linear alkyl group, alkenyl group or alkynyl group. The carbon number of the linear alkyl group, alkenyl group or alkynyl group may be 8 or more, 9 or more, 10 or more, 11 or more, or 12 or more, or may be 20 or less, 19 or less, 18 or less, 17 or less, 16 or less, 13 or less, or 12 or less.

In one example, the hydrocarbon chain is a chain including a linear structure, where the number of carbon atoms forming the linear structure may be in the range of 8 to 20. In other words, the chain may be linear or branched, but the number of carbon atoms may be calculated by only the number of carbon atoms forming the longest straight chain. Also, in the case of a branched chain, the number of carbon atoms can be calculated as the number of carbon atoms forming the longest chain. For example, when the chain is an n-pentyl group, the number of carbon atoms forming a linear structure is 5, and even when the chain is a 2-methylpentyl group, the number of carbon atoms forming a linear structure is 5.

The hydrocarbon chain containing a linear structure may be a linear or branched alkyl group, alkenyl group or alkynyl group, where the number of carbon atoms forming the linear structure may be 8 or more, 9 or more, 10 or more, 11 or more, or 12 or more, or may be 20 or less, 19 or less, 18 or less, 17 or less, 16 or less, 15 or less, 14 or less, 13 or less, or 12 or less.

In one example, one or more of the carbon atoms in the alkyl group, alkenyl group or alkynyl group, which is a hydrocarbon chain, may optionally be replaced by a heteroatom for the carbon atom, such as an oxygen atom, and at least one hydrogen atom of the alkyl group, alkenyl group or alkynyl group atom may be optionally substituted by another substituent.

On the other hand, the linker that can link the chain to the ring structure may be exemplified by an oxygen atom, a sulfur atom, —NR$_1$—, S(=O)$_2$—, a carbonyl group, an alkylene group, an alkenylene group, an alkynylene group, —C(=O)—X$_1$— or —X$_1$—C(=O)—, and the like, where R$_1$ may be hydrogen, an alkyl group, an alkenyl group, an alkynyl group, an alkoxy group or an aryl group, X$_1$ may be a single bond, an oxygen atom, a sulfur atom, —NR$_2$—, —S(=O)$_2$—, an alkylene group, an alkenylene group or an alkynylene group, where R$_2$ may be hydrogen, an alkyl group, an alkenyl group, an alkynyl group, an alkoxy group or an aryl group. An appropriate linker may be exemplified by an oxygen atom or a nitrogen atom. The chain may be connected to an aromatic structure via, for example, an oxygen atom or a nitrogen atom. In this case, the linker may be an oxygen atom, or may be —NR$_1$—, and in this case, R$_1$ is hydrogen, an alkyl group, an alkenyl group, an alkynyl group, an alkoxy group or an aryl group.

In one example, the first polymerized unit may be a unit represented by Formula 2 or 3 below.

In the following, the unit of Formula 2 may be an example of the above-mentioned first B polymerized unit, and the unit of Formula 3 may be an example of the above-mentioned first A polymerized unit.

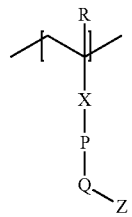

[Formula 2]

In Formula 2, R is hydrogen or an alkyl group having 1 to 4 carbon atoms, X is an oxygen atom, a sulfur atom, —S(=O)$_2$—, a carbonyl group, —C(=O)—O— or —O—C(=O)—, P is an arylene group having 6 to 18 carbon atoms, Q is a single bond, an oxygen atom, a sulfur atom, —S(=O)$_2$—, a carbonyl group, —C(=O)—O— or —O—C(=O)—, and Z is a chain as described above, for example a hydrocarbon chain:

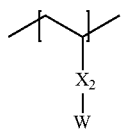

[Formula 3]

In Formula 3, X$_2$ is a single bond, an oxygen atom or a sulfur atom, and W is an aryl group having 6 to 18 carbon atoms and containing 3 or more halogen atoms.

In Formula 2, in another example, X may be an oxygen atom, a carbonyl group, —C(=O)—O— or —O—C(=O)—, or may be —C(=O)—O—, but is not limited thereto.

In Formula 2, P may be an arylene group having 6 to 18 carbon atoms or an arylene group having 6 to 12 carbon atoms, or may be a phenylene group.

In Formula 2, when P is a phenylene group, Q may be connected to a para position, which may be a single bond, an oxygen atom, a sulfur atom, —S(=O)$_2$—, a carbonyl group, —C(=O)—O— or —O—C(=O)— and may be, for example, a single bond, an oxygen atom, a carbonyl group, —C(=O)—O— or —O—C(=O)—, but is not limited thereto.

Z in Formula 2 is the above-mentioned chain or hydrocarbon chain, and its specific definition is the same as the contents already described.

On the other hand, in Formula 3 above, in one example, X$_2$ may be a single bond.

In Formula 3, the aryl group may be, for example, an aryl group having 6 to 18 carbon atoms or 6 to 12 carbon atoms, or may be a phenyl group.

The halogen atom contained in Formula 3 can be exemplified by a fluorine atom or a chlorine atom, and the like, and can be appropriately exemplified by a fluorine atom, but is not limited thereto. The halogen atom may also be substituted in the aryl group.

In one example, W in Formula 3 may be an aryl group having 6 to 18 carbon atoms or 6 to 12 carbon atoms, or may be a phenyl group, as substituted with 1 or more, 2 or more, 3 or more, 4 or more, or 5 or more halogen atoms (fluorine atoms or chlorine atoms, and the like). Here, the upper limit of the number of halogen atoms to be substituted is not particularly limited, and for example, 10 or less, 9 or less, 8 or less, 7 or less, or 6 or less halogen atoms may be present.

In another example, the unit of Formula 3 above may be represented by Formula 6 below.

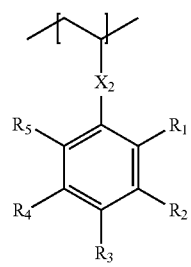

[Formula 6]

In Formula 6, X$_2$ is a single bond, an oxygen atom or a sulfur atom, and R$_1$ to R$_5$ are each independently hydrogen, an alkyl group, a haloalkyl group or a halogen atom, where the number of halogen atoms contained in R$_1$ to R$_5$ may be 3 or more.

In another example, X$_2$ in Formula 6 may be a single bond.

In Formula 6, R$_1$ to R$_5$ are each independently hydrogen, an alkyl group, a haloalkyl group or a halogen atom, provided that R$_1$ to R$_5$ may comprise 1 or more, 2 or more, 3 or more, 4 or more, or 5 or more halogen atoms, for example, fluorine atoms or chlorine atoms. The halogen atoms contained in R$_1$ to R$_5$ may be 10 or less, 9 or less, 8 or less, 7 or less, or 6 or less.

The halogen atom may also be contained in a haloalkyl group, and 1 or more, 2 or more, 3 or more, 4 or more, or 5 of R$_1$ to R$_5$ may be halogen atoms. At this time, the halogen atom may be a fluorine atom or a chlorine atom, and the like.

The first polymer may include any one unit of the units of Formulas 2 and 3 above, or may also include both of the above two, as the first polymerized unit, as long as the polymer line exhibits the characteristics of the pinning layer.

Wherein the first polymer comprises about 50 mol % or more, 55 mol % or more, 60 mol % or more, 65 mol % or more, 70 mol % or more, 75 mol % or more, 80 mol % or more, 85 mol % or more, 90 mol % or more, or 95 mol % or more of the first polymerized unit. The first polymerized unit may be contained in the first polymer in a ratio of less than about 100 mol %, 99 mol % or less, or 98 mol % or less.

In another example, the first polymerized unit may be contained in the first polymer in a ratio of 50 to 99 weight %. In another example, the ratio may be 50 weight % or more, 52 weight % or more, 54 weight % or more, 56 weight % or more, 58 weight % or more, 60 weight % or more, 62 weight % or more, 64 weight % or more, 66 weight % or more, 68 weight % or more, or 70 weight % or more, but is not limited thereto. In another example, the ratio may be 98 weight % or less, 97 weight % or less, 96 weight % or less, or 95 weight % or less, but is not limited thereto.

The first polymer may comprise a second polymerized unit represented by Formula 1 below together with the first polymerized unit.

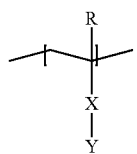

[Formula 1]

In Formula 1, R is hydrogen or an alkyl group, X is a single bond, an oxygen atom, a sulfur atom, —S(=O)$_2$—, a carbonyl group, an alkylene group, an alkenylene group, an alkynylene group, —C(=O)—X$_1$— or —X$_1$—C(=O)—, where X$_1$ is an oxygen atom, a sulfur atom, —S(=O)$_2$—, an alkylene group, an alkenylene group, an alkynylene group or an oxyalkylene group, and Y is a crosslinkable functional group. Here, the crosslinkable functional group of Y may be in a state of reacting with the substrate in the laminate. That is, the crosslinkable functional group may also serve to improve adhesiveness of the first polymer line to the substrate by reacting with the substrate.

In Formula 1, R is hydrogen or an alkyl group, where the alkyl group may be an alkyl group having 1 to 4 carbon atoms, or may be a methyl group or an ethyl group, and the like.

In Formula 1, in another example, X is an oxygen atom, a carbonyl group, —C(=O)—X$_1$— or —X$_1$—C(=O)—, where X$_1$ may be an oxygen atom, an alkylene group or an oxyalkylene group. In the case of being an oxyalkylene group, the oxygen atom may be connected to the carbon atom of —C(=O)—X$_1$— or —X$_1$—C(=O)—, and the alkylene group may be connected to Y of Formula 1. In one example, the alkylene group or the alkylene group in the oxyalkylene group may be a linear or branched alkylene group having 1 to 20 carbon atoms, 1 to 16 carbon atoms, 1 to 12 carbon atoms, 1 to 8 carbon atoms or 1 to 4 carbon atoms, or may be a methylene group, an ethylene group or a propylene group, and the like.

In Formula 1, Y is a crosslinkable functional group, which may be exemplified by, specifically, a hydroxyl group, a hydroxyalkyl group, an epoxy group, a glycidyl group, a glycidoxyalkyl group, a silane group or a carboxyl group, and the like.

The first polymer may comprise the second polymerized unit in a ratio of 1 to 50 parts by weight relative to 100 parts by weight of the entire first polymer. The ratio of the second polymerized unit is not particularly limited, which can be adjusted, for example, according to the type of the substrate on which the first polymer line is formed. In another example, the second polymerized unit may be contained in an amount of 50 parts by weight or less, 48 parts by weight or less, 46 parts by weight or less, 44 parts by weight or less, 42 parts by weight or less, 40 parts by weight or less, 38 parts by weight or less, 36 parts by weight or less, 34 parts by weight or less, 32 parts by weight or less, or 30 parts by weight or less, but is not limited thereto.

In another example, the second polymerized unit may be included in a ratio of about 0.4 mol to 10 mol per 100 mol of the first polymerized unit. For example, the second polymerized unit may be about 0.6 mol or more, about 0.8 mol or more, about 1 mol or more, about 1.2 mol or more, about 1.4 mol or more, about 1.6 mol or more, about 1.8 mol or more, or 2 mol or more per 100 mol of the first polymerized unit, or may also be included in a ratio of about 9 mol or less, 8 mol or less, 7 mol or less, 6 mol or less, 5 mol or less, 4 mol or less, 3.5 mol or less, 3 mol or less, or 2.5 mol or less.

The first polymer may comprise only the first and second polymerized units as the polymerized units, or may also comprise other polymerized units as required. Such a third polymerized unit may be exemplified by a (meth)acrylic acid ester-derived polymerized unit such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate or octyl (meth)acrylate; or a styrene-derived polymerized unit such as styrene, 4-trimethylsilylstyrene, 2,3,4,5,6-pentafluorostyrene, 3,4,5-trifluorostyrene, 2,4,6-trifluorostyrene or 4-fluorostyrene, but is not limited thereto.

When the third polymerized unit is included, the ratio is not particularly limited, which can be adjusted, for example, according to the kind of the block copolymer to be applied. In one example, the ratio of the third polymerized unit in the random copolymer may be about 5 mol % to 95 mol % or so in the entire random copolymer, but is not limited thereto. In another example, the ratio may be about 5 mol % or more, 6 mol % or more, 7 mol % or more, 8 mol % or more, 9 mol % or more, or 10 mol % or more, and may also be 95 mol % or less, 94 mol % or less, 93 mol % or less, 92 mol % or less, 91 mol % or less, or 90 mol % or less.

The first polymer may not include a crosslinkable functional group at the terminal, for example, at both terminals. At this time, the crosslinkable functional group can be exemplified by a hydroxyl group, a hydroxyalkyl group, an epoxy group, a glycidyl group, a glycidoxyalkyl group, a silane group or a carboxyl group, and the like, as described above.

The first polymer may have a number average molecular weight (Mn) in a range of, for example, 2,000 to 500,000. In this specification, the term number average molecular weight is a value converted to standard polystyrene measured using GPC (gel permeation chromatograph) and the term molecular weight herein means a number average molecular weight, unless otherwise specified. In addition, unless otherwise specified, the unit of the number average molecular weight is g/mol. In another example, the molecular weight (Mn) may be 3,000 or more, 4,000 or more, 5,000 or more, 6,000 or more, 7,000 or more, 8,000 or more, 9,000 or more, 10,000 or more, 20,000 or more, 30,000 or more, 40,000 or more, 50,000 or more, 60,000 or more, 70,000 or more, 80,000 or more, 90,000 or more, or about 100,000 or more or so. In another example, the molecular weight (Mn) may be about 400,000 or less, 300,000 or less, or 200,000 or less or so. The molecular weight of the first polymer can be adjusted according to the purpose.

The method for producing the first polymer is not particularly limited. For example, the first polymer may be prepared by applying a free radical polymerization method or an LRP (Living Radical Polymerization) method and the like. As an example of the LRP method, anion polymerization in which polymerization is carried out in the presence of an inorganic acid salt such as an alkali metal or alkaline earth metal salt or an organoaluminum compound using an organic rare earth metal complex or an organic alkali metal compound as an initiator, an atom transfer radical polymerization method (ATRP) using an atom transfer radical polymerization agent as a polymerization inhibitor, an ARGET (Activators Regenerated by Electron Transfer) atom transfer radical polymerization method (ATRP), which uses an atom transfer radical polymerization agent as a polymerization initiator, but performs polymerization under an organic or inorganic reducing agent that generates electrons, an ICAR (Initiators for Continuous Activator Regeneration) atom transfer radical polymerization method, a polymerization method by reversible addition-fragmentation chain transfer (RAFT) using an inorganic reducing agent and a reversible addition-fragmentation chain transfer agent or a method of using an organotellurium compound as an initiator, and the like can be exemplified, and a suitable method may be employed among the above methods.

The kind of the radical initiator that can be used in the polymerization process is not particularly limited. For example, an azo initiator such as AIBN (azobisisobutyronitrile) or 2,2'-azobis-(2,4-dimethylvaleronitrile), ABCN (1,1'-azobis(cyclohexanecarbonitrile)) or a peroxide initiator such as BPO (benzoyl peroxide) or DTBP (di-tert-butyl peroxide) may be applied, and for example, like a method using thermal self initiation of a styrenic monomer, a polymerization method using no initiator may be also applied depending on the type of the monomer.

The polymerization process can be carried out, for example, in a suitable solvent, and in this case, as an applicable solvent, a solvent such as methylene chloride, 1,2-dichloroethane, chlorobenzene, dichlorobenzene, benzene, toluene, anisole, acetone, chloroform, tetrahydrofuran, dioxane, monoglyme, diglyme, dimethylformamide, dimethylsulfoxide or dimethylacetamide can be exemplified, but is not limited thereto. After forming the random copolymer, the random copolymer can be obtained by precipitation using a non-solvent, where as the usable non-solvent, an alcohol such as methanol, ethanol, n-propanol or isopropanol, a glycol such as ethylene glycol, an ether solvent such as n-hexane, cyclohexane, n-heptane or petroleum ether, and the like can be exemplified, but is not limited thereto.

In the field of polymer synthesis, a method for producing a polymer by performing polymerization depending on a monomer forming the polymer is known, and any of the above methods may be applied upon producing the random copolymer of the present application.

The first polymer line may comprise only the first polymer, or may appropriately comprise other components in addition to the first polymer, if necessary. The first polymer line may comprise the first polymer as a main component. In this specification, the fact that any component (A) is included as a main component in any object (B) may mean a case where the object (B) comprises 55 weight % or more, 60 weight % or more, 65 weight % or more, 75 weight % or more, 80 weight % or more, 85 weight % or more, 90 weight % or more, or 95 weight % or more. In another example, the ratio may be about 100 weight % or less, or about 99 weight % or less or so. Furthermore, other components that can be included together with the first polymer can be exemplified by an initiator or a catalyst, and the like, capable of mediating the reaction of the crosslinkable functional group of the unit of Formula 1 above.

The above-described first polymer or the first polymer line comprising the same may effectively form a pinning layer capable of inducing directionality of the pattern formed due to vertical or horizontal orientation of various block copolymers, for example, a block copolymer comprising blocks of a unit having a cyclic structure or blocks of a unit of a structure similar thereto, as described below. In addition, the first polymer or the first polymer line comprising the same may effectively form the pinning layer even in a low temperature process (for example, process of less than 130° C., 129° C. or less, 128° C. or less, 127° C. or less, 126° C. or less, 125° C. or less, 124° C. or less, 123° C. or less, 122° C. or less, 121° C. or less, or 120° C. or less) due to high reactivity with a substrate, and may also effectively realize the self-assembled structure while minimizing or eliminating defects in the pattern of the block copolymer, since it has low reactivity with the second polymer line serving as a neutral layer.

On the other hand, the second polymer line forming the stripe pattern together with the first polymer line may comprise a second polymer different from the first polymer. Here, the fact that the second polymer is different from the first polymer may mean a case where at least one kind of polymerized unit is different or the ratio and/or physical properties, such as the molecular weight, of the relevant polymerized unit are different even if the polymerized units are the same.

Such a second polymer line may be a unit serving as a so-called neutral layer, as described above.

Such a second polymer may be a random copolymer comprising a polymerized unit having, as a ring structure connected to the main chain, a ring structure including one or more halogen atoms and a polymerized unit having, as a ring structure connected to the main chain, a ring structure to which a chain having 8 or more chain-forming atoms is connected.

Here, the polymerized unit having, as the ring structure connected to the main chain, a ring structure including one or more halogen atoms may be the same unit as the first A polymerized unit mentioned in the above-described first polymer. Therefore, a specific description thereof is the same as the above-described part of the first A polymerized unit, and a specific example thereof may be the unit of Formula 3 or 6 above.

On the other hand, the polymerized unit having, as the ring structure connected to the main chain, a ring structure to which a chain having 8 or more chain-forming atoms is connected may be the same unit as the first B polymerized unit mentioned in the above-described first polymer. Therefore, a specific description thereof is the same as the above-described part of the first B polymerized unit, and a specific example thereof may be the unit of Formula 2 above.

That is, the second polymer may exhibit the desired neutral characteristics by comprising, in an appropriate ratio, the unit including the ring structure having halogen atoms and the unit having the ring structure to which the chain is connected.

At this time, the ratio of each unit is not particularly limited, which can be adjusted, for example, according to the kind of the block copolymer to be applied.

In one example, the unit comprising the ring structure having halogen atoms may be included in the second polymer in a ratio of about 50 mol % or more, 55 mol % or more, 60 mol % or more, 65 mol % or more, 70 mol % or more, 73 mol % or more, 75 mol % or more, or 80 mol % or more. The ratio of the unit having a ring structure having halogen atoms may also be less than about 100 mol %, 99 mol % or less, 95 mol % or less, 90 mol % or less, 85 mol % or less, or about 80 mol % or less or so.

In another example, the unit including the ring structure to which the chain is connected may be included in a ratio of about 1 mol to 50 mol per 100 mol of the unit including the ring structure having halogen atoms. For example, the unit including the ring structure to which the chain is connected may be about 2 mol or more, about 3 mol or more, about 4 mol or more, about 5 mol or more, about 6 mol or more, about 7 mol or more, about 8 mol or more, about 9 mol or more, about 10 mol or more, about 12 mol or more, about 14 mol or more, about 16 mol or more, about 18 mol or more, or 19.5 mol or more per 100 mol of the unit including the ring structure having halogen atoms, or may also be included in a ratio of about 49 mol or less, about 48 mol or less, about 47 mol or less, about 46 mol or less, about 45 mol or less, about 44 mol or less, about 43 mol or less, about 42 mol or less, about 41 mol or less, about 40 mol or less, about 39 mol or less, about 38 mol or less, about 37 mol or less, 36 mol or less, about 35 mol or less, 34 mol or less, about 33 mol or less, 32 mol or less, about 31 mol or less, 30 mol or less, about 29 mol or less, about 28 mol or less, about 27 mol or less, 26 mol or less, about 25 mol or less, 24 mol or less, about 23 mol or less, 22 mol or less, or 21 mol or less.

Under such a ratio, desired neutral characteristics can be adequately ensured.

The second polymer may optionally comprise necessary units in addition to the above-described two units. At this time, the type of the applicable unit can be exemplified by a known crosslinkable functional group-imparting unit and the like, but is not limited thereto.

The second polymer may have a molecular weight (Mn) in a range of, for example, 2,000 to 500,000. In another example, the molecular weight may be 3,000 or more, 4,000 or more, 5,000 or more, 6,000 or more, 7,000 or more, 8,000 or more, 9,000 or more, 10,000 or more, 20,000 or more, or 30,000 or more or so. In another example, the molecular weight may also be about 400,000 or less, 300,000 or less, 200,000 or less, 150,000 or less, 100,000 or less, 90,000 or less, 80,000 or less, 70,000 or less, 60,000 or less, 50,000 or less, or 45,000 or less or so.

The second polymer can also be produced in the same manner as the first polymer.

The second polymer line may comprise only the second polymer, or may appropriately comprise other components in addition to the second polymer, if necessary. The second polymer line may comprise the second polymer as a main component. Accordingly, as described above, the second polymer line may comprise the second polymer in an amount of 55 weight % or more, 60 weight % or more, 65 weight % or more, 70 weight % or more, 75 weight % or more, 80 weight % or more, 85 weight % or more, 90 weight % or more, or 95 weight % or more, or in an amount of about 100 weight % or less, or about 99 weight % or less or so.

The first polymer line and the second polymer line as described above are alternately and repeatedly formed on the substrate so that the stripe pattern can be realized.

In the plurality of polymer lines forming the stripe pattern, the width of the first polymer line ($W_1$ in FIG. 1) can be controlled within a range of approximately 0.2 L to 10 L. Here, in the block copolymer formed on the stripe pattern and implementing a self-assembled structure, L is the pitch of the self-assembled structure. In another example, the width ($W_1$) may be about 0.4 L or more, 0.6 L or more, 0.8 L or more, 1 L or more, 1.2 L or more, 1.4 L or more, 1.6 L or more, 1.8 L or more or 2 L or more, or may be 9.5 L or less, 9 L or less, 8.5 L or less, 8 L or less, 7.5 L or less, 7 L or less, 6.5 L or less, 6 L or less, 5.5 L or less, 5 L or less, 4.5 L or less, 4 L or less, 3.5 L or less, 3 L or less, or 2.5 L or less or so.

On the other hand, here, in one example, the ratio ($F_1/W_1$) of the pitch ($F_1$ in FIG. 1) to the width ($W_1$ in FIG. 1) of the first polymer line may be in a range of 1 to 20. In another example, the ratio ($F_1/W_1$) may be 1.1 or more, 1.2 or more, 1.3 or more, 1.4 or more, or 1.5 or more, or may also be 19 or less, 18 or less, 17 or less, 16 or less, 15 or less, 14 or less, 13 or less, 12 or less, 11 or less, 10 or less, 9 or less, 8 or less, 7 or less, 6 or less, 5 or less, 4 or less, 3 or less, or 2 or less or so.

In the plurality of polymer lines forming the stripe pattern, the width of the second polymer line ($W_2$ in FIG. 1) can be controlled within a range of approximately 0.2 L to 10 L. Here, in the block copolymer formed on the stripe pattern and implementing a self-assembled structure, L is the pitch of the self-assembled structure, as described above. In another example, the width ($W_2$) may be about 0.4 L or more, 0.6 L or more, 0.8 L or more, or 1 L or more, or may be 9.5 L or less, 9 L or less, 8.5 L or less, 8 L or less, 7.5 L or less, 7 L or less, 6.5 L or less, 6 L or less, 5.5 L or less, 5 L or less, 4.5 L or less, 4 L or less, 3.5 L or less, 3 L or less, 2 L or less, or 1.5 L or less or so.

On the other hand, in one example, the ratio ($F_2/W_2$) of the pitch ($F_2$ in FIG. 1) to the width ($W_2$ in FIG. 1) of the second polymer line may be in a range of 1 to 20. In another example, the ratio ($F_2/W_2$) may be 1.1 or more, 1.2 or more, 1.3 or more, 1.4 or more, 1.5 or more, 1.6 or more, 1.7 or more, 1.8 or more, 1.9 or more, 2 or more, 2.1 or more, 2.2 or more, 2.3 or more, 2.4 or more, 2.5 or more, 2.6 or more, 2.7 or more, 2.8 or more, 2.9 or more, or 3 or more, or may also be 19 or less, 18 or less, 17 or less, 16 or less, 15 or less, 14 or less, 13 or less, 12 or less, 11 or less, 10 or less, 9 or less, 8 or less, 7 or less, 6 or less, 5 or less, or 4 or less or so.

The range of the width or pitch of the stripe pattern may be controlled as above to suitably implement the desired pattern, but the applied scope in the present application is not limited to the above content, which may be appropriately changed in consideration of the kind of the block copolymer and the like.

On the other hand, here, the pitch of the first polymer lines is the distance from the start point of one first polymer line to the start point of the adjacent first polymer line, as indicated by $F_1$ in FIG. 1, and the pitch of the second polymer lines is the distance from the start point of one second polymer line to the start point of the adjacent second polymer line, as indicated by $F_2$ in FIG. 1.

Furthermore, the above-mentioned pitch (L) of the block copolymer may be confirmed by applying a known method such as a fast Fourier transform method to a block copolymer forming a self-assembled structure (for example, a lamellar structure), which may be approximately in a range of about 10 nm to 100 nm. In another example, the range may be 15 nm or more, 20 nm or more, 25 nm or more, or 30 nm or more, or may be 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, or 35 nm or less, but this may be changed according to the purpose by controlling the molecular weight of the block copolymer, the molecular weight distribution or the volume fraction of the blocks, and the like.

The length or the thickness of each polymer line forming the stripe pattern is not particularly limited. For example, the length of the polymer line can be adjusted to an appropriate range in consideration of the shape of the desired pattern or the size of the substrate, and the like. Furthermore, the thickness of the polymer line may be in a range of about 2 nm to 100 nm or 5 nm to 20 nm.

On the other hand, the method of forming such a polymer line on the substrate is not particularly limited. Various methods capable of forming a polymer pattern are known in the industry, where all of these methods can be applied. For example, the polymer lines can be formed by a lithography method such as ArF immersion lithography or EBL (e-beam lithography).

In one example, the laminate may further comprise a polymer membrane formed on the stripe pattern and having a self-assembled block copolymer.

For example, a self-assembled pattern of a block copolymer can be formed by forming a polymer membrane comprising a block copolymer on a substrate (100) on which such a stripe pattern is formed, and performing an annealing process or the like.

At this time, the self-assembled structure of the block copolymer may be, for example, a lamella, a sphere, a gyroid or a cylinder, and this structure may be vertically oriented.

The term vertical orientation indicates the orientation of the block copolymer, which may mean a case where the orientation direction of the self-assembled structure formed by the block copolymer is perpendicular to the substrate direction, as described above. For example, the vertical orientation may mean a case where each block domain of the self-assembled block copolymer lies side by side on the substrate surface, and the interface region of the block domain is formed substantially perpendicular to the substrate surface. In the present application, the term vertical is an expression in consideration of an error, and may be a sense including, for example, an error within ±10 degrees, ±8 degrees, ±6 degrees, ±4 degrees, or ±2 degrees.

In one example, the self-assembled structure of the block copolymer may be a lamellar pattern. For example, when a block copolymer comprising first and second blocks is used as the block copolymer, other segments within the segments of the first or second block, or other blocks covalently bonded thereto may form a regular structure such as a lamellar shape.

As the block copolymer, various kinds of block copolymers can be applied, but as a block copolymer capable of exhibiting excellent vertical orientation and linearity on the stripe pattern as above, a block copolymer having a first block including repeating units of a unit of Formula 4 below and a second block including repeating units of a unit of Formula 5 below can be used.

[Formula 4]

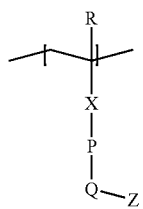

The Formula 4 is the same unit as the unit of Formula 2, which is an example of the first polymerized unit of the first polymer as already described. Accordingly, in Formula 4 above, the specific contents of R, X, P, Q and Z are the same as those described in the unit of Formula 2 of the first polymer.

[Formula 5]

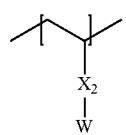

The Formula 5 is the same unit as the unit of Formula 3, which is an example of the first polymerized unit of the first polymer as already described. Accordingly, in Formula 5 above, the specific contents of $X_2$ and W are the same as those described in the unit of Formula 3 of the first polymer, and a specific example thereof may be the unit of Formula 6 as described above.

The first and second blocks may comprise repeating units of the unit of Formula 4 and repeating units of the unit of Formula 5 in an amount of about 80 mol % or more, 82 mol % or more, 84 mol % or more, 86 mol % or more, 88 mol % or more, or 90 mol % or more, or in an amount of about 100 mol % or less, 98 mol % or less, 96 mol % or less, 94 mol % or less, 92 mol % or less, or 90 mol % or less or so, respectively.

The block copolymer having the first and second blocks as above can realize a self-assembled structure having excellent vertical orientation and linearity on the above-described substrate through excellent interaction between the blocks.

The block copolymer of the present application may be a diblock copolymer containing only each of the first block and the second block as described above by one, or may be a block copolymer of triblocks or more containing three or more blocks.

When the volume of the first block and the second block has been 1 in the block copolymer, the volume fraction of the first block may be in a range of 0.4 to 0.8 and the volume fraction of the second block may be in a range of 0.2 to 0.6.

In another example, the volume fraction of the first block may be about 0.41 or more, about 0.42 or more, about 0.43 or more, or about 0.44 or more, or may also be about 0.75 or less, about 0.7 or less, about 0.65 or less, about 0.6 or less, about 0.55 or less, or about 0.5 or less. In another example, the volume fraction of the second block may be about 0.25 or more, 0.3 or more, 0.35 or more, 0.4 or more, 0.45 or more, about 0.5 or more, or about 0.55 or more, or may also be about 0.59 or less, about 0.58 or less, about 0.57 or less, or about 0.56 or less or so. The block copolymer containing the first and second blocks in the above ratios can exhibit excellent self-assembly properties on the above-described stripe pattern. The sum of the volume fractions of the first block and the second block may be 1. The volume fraction of each block of the block copolymer can be obtained based on the density of each block and the molecular weight measured by GPC (gel permeation chromatography).

The molecular weight (Mn) of the block copolymer may be, for example, in a range of 30,000 to 60,000. In another example, the molecular weight (Mn) may be, for example, about 35,000 or more, or 40,000 or more. In another example, the molecular weight (Mn) may be about 55,000 or less, or about 50,000 or less or so. The block copolymer may have polydispersity (Mw/Mn) in a range of 1.01 to 1.60. In another example, the polydispersity may be about 1.05 or more, about 1.1 or more, or about 1.15 or more, or may be about 1.55 or less, about 1.5 or less, about 1.45 or less, about 1.4 or less, about 1.35 or less, about 1.3 or less, about 1.25 or less or about 1.2 or less or so.

In this range, the block copolymer can exhibit proper self-assembly properties on the above-described stripe pattern. The number average molecular weight of the block copolymer and the like can be adjusted in consideration of the desired self-assembled structure (e.g., the pitch of the lamellar pattern or the like) and the like.

A specific method for producing such a block copolymer is not particularly limited, and for example, the block copolymer can be produced by applying a known method for producing a block copolymer using a monomer capable of forming each block.

For example, the block copolymer can be prepared by an LRP (living radical polymerization) method using the above monomers. For example, there is anionic polymerization in which the block copolymer is synthesized in the presence of an inorganic acid salt such as an alkali metal or an alkali earth metal by using an organic rare earth metal complex as a polymerization initiator or by using an organic alkali metal compound as a polymerization initiator, an anionic polymerization method in which the block copolymer is synthesized in the presence of an organic aluminum compound by using an organic alkali metal compound as a polymerization initiator, an atom transfer radical polymerization method (ATRP) using an atom transfer radical polymerization agent as a polymerization inhibitor, an ARGET (Activators Regenerated by Electron Transfer) atom transfer radical polymerization method (ATRP), which uses an atom transfer radical polymerization agent as a polymerization initiator, but performs polymerization under an organic or inorganic reducing agent that generates electrons, an ICAR (Initiators for Continuous Activator Regeneration) atom transfer radical polymerization method (ATRP), a polymerization method by reversible addition-fragmentation chain transfer (RAFT) using an inorganic reducing agent and a reversible addition-fragmentation chain transfer agent or a method of using an organotellurium compound as an initiator, and the like, and a suitable method may be selected among these methods and applied.

For example, the block copolymer can be prepared in a manner comprising polymerizing a reactant comprising monomers capable of forming the blocks in the presence of a radical initiator and a living radical polymerization reagent by a living radical polymerization method.

The method of forming the other block included in the copolymer together with the block formed by using the monomer upon producing the block copolymer is not particularly limited, where the other block can be formed by selecting an appropriate monomer in consideration of the kind of the desired block.

The process of producing the block copolymer may further comprise, for example, a process of precipitating the polymerization product produced through the above processes in a non-solvent.

The kind of the radical initiator is not particularly limited, which may be appropriately selected in consideration of polymerization efficiency, and for example, an azo compound such as AIBN (azobisisobutyronitrile) or 2,2'-azobis-(2,4-dimethylvaleronitrile), or peroxide series such as BPO (benzoyl peroxide) or DTBP (di-t-butyl peroxide) may be used.

The living radical polymerization process may be performed in a solvent such as, for example, methylene chloride, 1,2-dichloroethane, chlorobenzene, dichlorobenzene, benzene, toluene, acetone, chloroform, tetrahydrofuran, dioxane, monoglyme, diglyme, dimethylformamide, dimethyl sulfoxide or dimethylacetamide.

As the non-solvent, an alcohol such as methanol, ethanol, normal propanol or isopropanol, a glycol such as ethylene glycol, n-hexane, cyclohexane, n-heptane or ether series such as petroleum ether can be used, without being limited thereto.

The present application also relates to a method for producing a patterned substrate. The production method may comprise a step of forming the self-assembled structure of the block copolymer including the first block and the second block as described above on the laminate comprising the already-described substrate and the stripe pattern thereon.

Here, the method of forming the self-assembled structure of the block copolymer on the stripe pattern and the substrate as described above using the block copolymer is not particularly limited and a known method can be applied. For example, the polymer membrane can be formed by dispersing the block copolymer in an appropriate solvent at a predetermined concentration to prepare a coating solution and coating the coating solution by a known coating method such as spin coating.

If necessary, an annealing process for forming a self-assembled structure in the polymer membrane thus formed may be further performed. This annealing can be performed, for example, by aging or heat-treating the layer.

The aging or heat treatment may be performed based on, for example, the phase transition temperature or the glass transition temperature of the block copolymer, and may be performed at, for example, a temperature above the glass transition temperature or the phase transition temperature. The time for which this heat treatment is performed is not particularly limited, and the treatment can be performed within a range of, for example, about 1 minute to 72 hours, but the time can be changed as needed. In addition, the heat treatment temperature of the polymer membrane may be, for example, about 100° C. to 250° C., but this may be changed in consideration of the block copolymer to be used.

In one example, when the heat treatment or thermal annealing is performed, the heat treatment or the like can be performed at a temperature of less than about 130° C. The temperature may be less than 130° C., 129° C. or less, 128° C. or less, 127° C. or less, 126° C. or less, 125° C. or less, 124° C. or less, 123° C. or less, 122° C. or less, 121° C. or less, or 120° C. or less, and the lower limit is not particularly limited, but may be, for example, 100° C. or more. By annealing a pinning composition at a temperature within the above range, the above-described pinning composition sufficiently reacts with the substrate to form a pinning layer, and simultaneously suppresses the reaction with the neutral layer, whereby defects can be minimized upon inducing the self-assembled structure of the block copolymer.

The time required for the heat treatment may be varied as needed, which may be adjusted within a range of, for example, about 1 minute to 72 hours or about 1 minute to 24 hours. The temperature and time of the heat treatment may be adjusted to an appropriate level in consideration of the type of the functional group of the random copolymer of the pinning layer composition, and the like.

In another example, the formed layer may also be solvent-aged for about 1 minute to 72 hours in a non-polar solvent and/or a polar solvent at room temperature.

Also, the method for producing a patterned substrate of the present application may further comprise a step of selectively removing any one block from the self-assembled block copolymer of the membrane thus formed on the stripe pattern. For example, if the block copolymer comprises the first block and the second block as described above, the method may comprise a process of selectively removing the first or second block from the block copolymer. Through this process, for example, only the block not selectively removed may be present on the substrate. The method for producing a patterned substrate may further comprise etching the substrate after selectively removing one or more blocks of the block copolymer as above.

The method of selectively removing any one block of the block copolymer in the above method is not particularly limited, and for example, a method of removing a relatively soft block by irradiating the polymer membrane with an appropriate electromagnetic wave, for example, ultraviolet rays or the like, can be used. In this case, the ultraviolet irradiation condition is determined according to the type of the block of the block copolymer, and the method can be performed, for example, by being irradiated with ultraviolet rays having a wavelength of about 254 nm for 1 minute to 60 minutes.

In addition, following the ultraviolet irradiation, a step of treating the polymer membrane with an acid or the like to further remove the segment decomposed by ultraviolet rays may also be performed.

Furthermore, the step of etching the substrate using the polymer membrane in which the blocks are selectively removed as a mask is not particularly limited, which may be performed, for example, through a reactive ion etching step using $CF_4$/Ar ions or the like and following this process, a step of removing the polymer membrane from the substrate by an oxygen plasma treatment or the like may also be performed.

Advantageous Effects

The present application relates to a laminate and a method for producing a patterned substrate. The method may be applied to a process of manufacturing devices such as, for example, electronic devices and integrated circuits, or other applications, such as manufacture of integrated optical systems, guidance and detection patterns of magnetic domain memories, flat panel displays, liquid crystal displays (LCDs), thin film magnetic heads or organic light emitting diodes, and the like, and may also be used to build a pattern on a surface used in manufacture of discrete track media, such as integrated circuits, bit-patterned media and/or magnetic storage devices such as hard drives.

MODE FOR INVENTION

Hereinafter, the present application will be described in detail by way of examples according to the present application and comparative examples, but the scope of the present application is not limited by the following examples.

1. NMR Measurement

NMR analyses were performed at room temperature using an NMR spectrometer including a Varian Unity Inova (500 MHz) spectrometer with a triple resonance 5 mm probe. The analytes were diluted in a solvent for NMR measurement ($CDCl_3$) to a concentration of about 10 mg/ml, and chemical shifts were expressed in ppm.

<Application Abbreviation>
br=broad signal, s=singlet, d=doublet, dd=double doublet, t=triplet, dt=double triplet, q=quartet, p=quintet, m=multiplet.

2. GPC (Gel Permeation Chromatograph)

The number average molecular weight (Mn) and the molecular weight distribution were measured using GPC (gel permeation chromatography). Into a 5 mL vial, a polymer material to be measured was put and diluted in THF (tetrahydrofuran) to be a concentration of about 1 mg/mL or so. Subsequently, a standard sample for calibration and a sample to be analyzed were filtered through a syringe filter (pore size: 0.45 μm) and then measured. As the analytical program, ChemStation from Agilent Technologies was used, and the elution time of the sample was compared with the calibration curve to obtain the weight average molecular weight (Mw) and the number average molecular weight (Mn), respectively, and the molecular weight distribution (PDI) was calculated by the ratio (Mw/Mn) thereof. The measurement conditions of GPC are as follows.

<GPC Measurement Condition>
Instrument: 1200 series from Agilent Technologies
Column: using two PLgel mixed B from Polymer Laboratories
Solvent: THF
Column temperature: 35° C.
Sample concentration: 1 mg/mL, 200 μL injection
Standard samples: polystyrene (Mp: 3900000, 723000, 316500, 52200, 31400, 7200, 3940, 485)

PREPARATION EXAMPLE 1

A monomer (DPM-C12) of Formula A below was synthesized in the following manner. Hydroquinone (10.0 g, 94.2 mmol) and 1-bromododecane (23.5 g, 94.2 mmol) were placed in a 250 mL flask, dissolved in 100 mL of acetonitrile, and then an excess amount of potassium carbonate was added thereto and reacted at 75° C. for about 48 hours under a nitrogen condition. After the reaction, the remaining potassium carbonate was filtered off and the acetonitrile used in the reaction was also removed. A mixed solvent of DCM (dichloromethane) and water was added thereto to work up the mixture, and the separated organic layers were collected and passed through $MgSO_4$ to be dehydrated. 4-Dodecyloxyphenol (9.8 g, 35.2 mmol) in a white solid phase was obtained in a yield of about 37% using dichloromethane in column chromatography.

<NMR Analysis Results>
$^1$H-NMR (CDCl3): δ6.77 (dd, 4H); δ4.45 (s, 1H); δ3.89 (t, 2H); δ1.75 (p, 2H); δd1.43 (p, 2H); δd1.33-1.26 (m, 16H); δd0.88 (t, 3H).

The synthesized 4-docecyloxyphenol (9.8 g, 35.2 mmol), methacrylic acid (6.0 g, 69.7 mmol), DCC (dicyclohexylcarbodiimide) (10.8 g, 52.3 mmol) and DMAP (p-dimethylaminopyridine) (1.7 g, 13.9 mmol) were placed in the flask and 120 mL of methylene chloride was added thereto, and then reacted at room temperature for 24 hours under nitrogen. After completion of the reaction, the salt (urea salt) generated during the reaction was filtered off and the remaining methylene chloride was also removed. Impurities were removed using hexane and DCM (dichloromethane) as the mobile phase in column chromatography and the product obtained again was recrystallized in a mixed solvent of methanol and water (1:1 mix) to obtain the target product (compound of Formula A below) (7.7 g, 22.2 mmol) in a white solid phase in a yield of 63%.

<NMR Analysis Results>
$^1$H-NMR (CDCl3): δ7.02 (dd, 2H); δd6.89 (dd, 2H); δd6.32 (dt, 1H); δd5.73 (dt, 1H); δd3.94 (t, 2H); δd2.05 (dd, 3H); δd1.76 (p, 2H); δd1.43 (p, 2H); 1.34-1.27 (m, 16H); δd0.88 (t, 3H).

[Formula A]

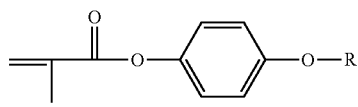

In Formula A, R is a linear alkyl group having 12 carbon atoms (dodecyl group).

PREPARATION EXAMPLE 2

Synthesis of Random Copolymer (B)

1.72 g of pentafluorostyrene, 0.024 g of hydroxymethyl methacrylate, 10 mg of an RAFT (reversible addition-fragmentation chain transfer) reagent (2-cyano-2-propyl benzodithioate), 6 mg of V-40 (1,1'-azobis(cyclohexanecarbonitrile)) and 1.76 g of trifluorotoluene were placed in a 10 mL flask (Schlenk flask), stirred at room temperature for 30 minutes under a nitrogen atmosphere, and then subjected to RAFT (reversible addition-fragmentation chain transfer) polymerization reaction at 95° C. for 3 hours. After the polymerization, the reaction solution was precipitated in 200 mL of methanol as an extraction solvent, and then dried after filtering under reduced pressure to prepare a random copolymer. The molecular weight (Mn) and the molecular weight distribution (Mw/Mn) of the random copolymer were 19,200 and 1.12, respectively.

PREPARATION EXAMPLE 3

Synthesis of Random Copolymer (C)

0.520 g of the compound (DPM-C12) of Preparation Example 1, 1.456 g of pentafluorostyrene, 0.142 g of glycidyl methacrylate, 3.3 mg of AIBN (azobisisobutyronitrile) and 1.62 mL of tetrahydrofuran were placed in a 10 mL flask (Schlenk flask), stirred at room temperature for 30 minutes under a nitrogen atmosphere, and then subjected to polymerization reaction at 60° C. for 12 hours. After the polymerization, the reaction solution was precipitated in 250 mL of methanol as an extraction solvent, and then dried after filtering under reduced pressure to prepare a random copolymer. The molecular weight (Mn) and the molecular weight distribution (Mw/Mn) of the random copolymer were 39,400 and 1.96, respectively.

PREPARATION EXAMPLE 4

Synthesis of Block Copolymer (D)

2.0 g of the monomer (A) of Preparation Example 1 and 64 mg of cyanoisoproyl dithiobenzoate as an RAFT (reversible addition-fragmentation chain transfer) reagent, 23 mg of AIBN (azobisisobutyronitrile) as a radical initiator and 5.34 mL of benzene were placed in a 10 mL flask (Schlenk flask) and stirred at room temperature for 30 minutes under a nitrogen atmosphere, and then an RAFT (reversible addition-fragmentation chain transfer) polymerization reaction was performed at 70° C. for 4 hours. After the polymerization, the reaction solution was precipitated in 250 mL of methanol as an extraction solvent, and then filtered under reduced pressure and dried to prepare a pink macro initiator. The yield of the macro initiator was about 82.6 weight % and the molecular weight (Mn) and molecular weight distribution (Mw/Mn) were 9,000 and 1.16, respectively.

0.3 g of the obtained macro initiator, 2.7174 g of pentafluorostyrene and 1.306 mL of benzene were placed in a 10 mL flask (Schlenk flask) and stirred at room temperature for 30 minutes under a nitrogen atmosphere, and then subjected to RAFT (reversible addition-fragmentation chain transfer) polymerization reaction at 115° C. for 4 hours. After the polymerization, the reaction solution was precipitated in 250 mL of methanol as an extraction solvent, and then filtered under reduced pressure and dried to prepare a pale pink block copolymer. The block copolymer comprises a polymer segment A, which is derived from the monomer (A) of Preparation Example 1 and has 12 chain-forming atoms (the number of carbon atoms of R in Formula A), and a polymer segment B derived from the pentafluorostyrene monomer. Here, the volume fraction of the polymer segment A was about 0.45 or so, and the volume fraction of the polymer segment B was about 0.55 or so.

PREPARATION EXAMPLE 5

Synthesis of Polymer (E)

2.39 g of pentafluorostyrene, 30 mg of an RAFT (reversible addition-fragmentation chain transfer) reagent (2-hydroxyethyl-2-(((dodecylthion)carbonothioyl)thio-2-methyl-propanoate), 5 mg of AIBN (azobisisobutyronitrile) and 0.80 g of anisole were placed in a 10 mL flask (Schlenk flask), stirred at room temperature for 30 minutes under a nitrogen atmosphere, and then subjected to RAFT (reversible addition-fragmentation chain transfer) polymerization reaction at 70° C. for 6 hours. After the polymerization, the reaction solution was precipitated in 200 mL of methanol as an extraction solvent, and then dried after filtering under reduced pressure to prepare a polymer (E). The molecular weight (Mn) and the molecular weight distribution (Mw/Mn) of the random copolymer were 10,000 and 1.10, respectively.

PREPARATION EXAMPLE 6

Synthesis of Random Copolymer (F)

0.444 g of the monomer (A) of Preparation Example 1, 1.304 g of pentafluorostyrene, 0.142 g of GMA (glycidyl methacrylate), 1.304 g of GBLMA (methacrylate gamma butyrolactone), 0.033 g of AIBN (azobisisobutyronitrile) as a radical initiator and 1.7 mL of tetrahydrofuran were mixed and polymerized at 60° C. for about 12 hours under a nitrogen atmosphere to prepare a random copolymer (F). After the polymerization, the reaction solution was precipitated in methanol as an extraction solvent, and then dried after filtering under reduced pressure to obtain a random copolymer (F). The molecular weight (Mn) and the molecular weight distribution (Mw/Mn) of the random copolymer (F) were 34,200 and 2.09, respectively.

PREPARATION EXAMPLE 7

Synthesis of Block Copolymer (G)

4.0 g of the monomer (A) of Preparation Example 1 and 47 mg of cyanoisopropyl dithiobenzoate as an RAFT (reversible addition fragmentation chain transfer) reagent, 3 mg of AIBN (azobisisobutyronitrile) as a radical initiator and 9.45 mL of anisole were placed in a 25 mL flask (Schlenk flask), stirred at room temperature for 30 minutes under a nitrogen atmosphere, and then subjected to RAFT (reversible addition fragmentation chain transfer) polymerization reaction at 95° C. for 1 hour. After the polymerization, the reaction solution was precipitated in 250 mL of methanol as an extraction solvent, and then filtered under reduced pressure and dried to prepare a pink macro initiator. The yield of the macro initiator was about 80.6 weight %, and the molecular weight (Mn) and the molecular weight distribution (Mw/Mn) were 13,200 and 1.19, respectively.

0.8 g of the obtained macro initiator, 3.53 g of pentafluorostyrene, 1.5 mg of V-40 (1,1'-azobis (cyclohexane-1- carbonitrile)) and 4.3 mL of trifluorotoluene were placed in a 10 mL flask (Schlenk flask), stirred at room temperature for 30 minutes under a nitrogen atmosphere, and then subjected to RAFT (reversible addition fragmentation chain transfer) polymerization reaction at 95° C. for 20 hours. After the polymerization, the reaction solution was precipitated in 250 mL of methanol as an extraction solvent, and then filtered under reduced pressure and dried to prepare a pale pink block copolymer. The block copolymer comprises a polymer segment A, which is derived from the monomer (A) of Preparation Example 1 and has 12 chain-forming atoms (the number of carbon atoms of R in Formula A), and a polymer segment B derived from the pentafluorostyrene monomer. Here, the volume fraction of the polymer segment A was about 0.40 or so, and the volume fraction of the polymer segment B was about 0.60 or so.

TEST EXAMPLES 1 TO 6

The random copolymer (B) of Preparation Example 2 was coated to a thickness of about 30 nm on a silicon wafer without any treatment, and then subjected to thermal annealing for 5 minutes by adjusting the temperature conditions differently (Test Examples 1 to 6) as shown in the following table. Subsequently, the silicon wafer was immersed in fluorobenzene for 10 minutes to remove the unreacted random copolymer (B). A pattern formed by coating the block copolymer (D) of Preparation Example 4 to a thickness of about 30 nm and thermal annealing it at 230° C. for 5 minutes was confirmed through an SEM (scanning electron microscope).

The block copolymer (D) has a characteristic that it is vertically oriented on a silicon wafer without any treatment and a horizontal orientation and a vertical orientation are mixed on the membrane of the random copolymer (B). Therefore, by confirming the orientation of the block copolymer (D), it can be confirmed whether or not the random copolymer (B) reacts with the silicon wafer to form a membrane. As a result of the confirmation, as confirmed in Table 1 below, the random copolymer (B) sufficiently reacted with the substrate even at a low temperature of 120° C. to form a membrane.

COMPARATIVE TEST EXAMPLES 1 TO 6

Experiments were conducted under the same conditions as in Test Examples 1 to 6, except that the polymer (E) of Preparation Example 5 was used instead of the random copolymer (B) of Preparation Example 2.

TABLE 1

| | Annealing Temperature (° C.) | Reaction in Test Example | Reaction in Comparative Test Example |
|---|---|---|---|
| 1 | 160 | O | O |
| 2 | 150 | O | O |
| 3 | 140 | O | O |
| 4 | 130 | O | O |
| 5 | 120 | O | X |
| 6 | 110 | O | X |

The reaction in Table 1 was evaluated by photographing orientation of a block copolymer on a silicon wafer with an SEM (scanning electron microscope) (acceleration voltage: 2.0 kV, 50,000 times), where the case that the vertical and horizontal orientation structures of the block copolymer (D) were observed in a mixed state was evaluated as O, and the case that the vertical orientation structure was mainly identified was indicated as X. FIGS. 2 and 4 are SEM (scanning electron microscope) images for Test Examples 4 and 5, and it can be confirmed that the lamellar pattern of the block copolymer (D) is formed in a state where the annealing and the horizontal orientation are mixed. FIGS. 3 and 5 are SEM (scanning electron microscope) images of Comparative Test Examples 4 and 5. When the heat treatment temperature (annealing temperature) was 130° C., it can be confirmed that the lamellar pattern of the block copolymer (D) is formed in a state where the vertical and horizontal orientation states are mixed, but when the heat treatment temperature (annealing temperature) was 120° C. on the same substrate, it can be confirmed that the vertically oriented lamellar pattern is mainly formed. As a result, it can be confirmed that the polymer (E) is not sufficiently bonded on the substrate at an annealing temperature of less than 130° C.

TEST EXAMPLE 7 AND COMPARATIVE TEST EXAMPLE 7

The random copolymer (B) of Preparation Example 2 (Test Example 7) and the polymer (E) of Preparation Example 5 (Comparative Test Example 7) were each coated on the membrane of the random copolymer (C) of the substrate on which the membrane of the random copolymer (C) of Preparation Example 3 was formed to a thickness of about 10 nm, and then subjected to thermal annealing for 5 minutes at the temperature conditions as shown in the following table. Thereafter, the unreacted random copolymer (B) or polymer (E) was removed by immersing it in fluorobenzene for 10 minutes. It was confirmed whether or not the random copolymer (B) or the polymer (E) reacted with the random copolymer (C) through a lamellar pattern formed by again coating the block copolymer (D) thereon and thermally annealing it at 230° C. for 5 minutes.

TABLE 2

| | | Annealing Temperature | Reaction |
|---|---|---|---|
| Test Example 7 | Random Copolymer (B) | 120 | X |
| Comparative Test Example 7 | Polymer (E) | 160 | O |

The reaction in Table 2 was evaluated by photographing orientation of a block copolymer with an SEM (scanning electron microscope) (acceleration voltage: 2.0 kV, 50,000 times), where if no defect or a small amount of defects were observed on the surface of the vertical lamellar orientation of the block copolymer (D), it was evaluated as O, and if a number of defects were observed, it was indicated as X. FIG. 6 is an SEM (scanning electron microscope) image of Test Example 7. It can be seen that if the membrane of the random copolymer (B) is formed on the substrate on which the membrane of the random copolymer (C) is formed and the block copolymer (D) is oriented after annealing at 120° C., a vertical lamellar pattern is formed, and it can be confirmed that the random copolymer (B) hardly reacted with the membrane of the random copolymer (C) and formed no bond with the membrane of the random copolymer (C). However, in the case of the polymer (E) (Comparative Test Example 7), defects in the lamellar pattern were confirmed. From this, it can be expected that the polymer (E) of Comparative Test Example 7 reacted with the membrane of the random copolymer (C) to form bonds.

EXAMPLE 1

The stripe pattern as shown in FIG. 1 was formed on a silicon wafer substrate by forming first polymer lines (10) using the random copolymer (B) of Preparation Example 2 as the first polymer and forming second polymer lines (20) using the random copolymer (F) of Preparation Example 6 as the second polymer. At this time, the width (W1) of the first polymer line was approximately 60 nm and the pitch (F1) was approximately 90 nm; and the width (W2) of the second polymer line was approximately 30 nm and the pitch (F2) was approximately 90 nm. The stripe pattern was formed by applying a conventional electron beam resist method and an RIE (reactive ion etching) method. First, the random copolymer (F) of Preparation Example 6 was diluted in fluorobenzene to a solid concentration of about 0.2 weight % to prepare a coating solution, and a second polymer layer was formed by spin-coating the coating solution on the silicon wafer substrate to form a membrane having a thickness of about 20 nm and then annealing it at 200° C. for about 5 minutes and dipping it in fluorobenzene to remove unreacted components. Subsequently, a solution of an electron beam resist material solution (AR-P-6200, Allresist) diluted in anisole approximately 4 times by weight ratio was coated on the second polymer layer to a thickness of 60 nm by a spin coating method. Thereafter, it was baked at 170° C. for 5 minutes and subjected to electron beam exposure according to the desired pattern. Then, it was immersed in a mixed solvent of methyl isobutyl ketone (MIBK) and isopropyl alcohol (IPA) (MIBK:IPA=1:3 (volume ratio)) for 90 seconds and developed by nitrogen blowing. Subsequently, the second polymer layer was patterned by performing the RIE (reactive ion etching) using the resist material patterned by the exposure and development as a mask, and the substrate was immersed in a resist remover (DMAC (N,N-dimethylacetamide)) and subjected to sonication for 10 minutes or so to form the second polymer lines. The sonication treatment was performed under a condition of 40 kHz at room temperature. Subsequently, a coating solution obtained by dissolving the random copolymer (B) of Preparation Example 2 in fluorobenzene at a concentration of about 1.0 weight % was spin-coated on the substrate, on which the second polymer lines were formed, to a thickness of about 38 nm and annealed at 120° C. for 5 minutes or so, and then the substrate was immersed in the fluorobenzene to remove the unreacted random copolymer (B), whereby the substrate, on which the first and second polymer lines were formed, was produced. Subsequently, a coating solution prepared by dissolving the block copolymer (G) of Preparation Example 7 (a lamellar pattern with a pitch of about 30 nm was formed, which was confirmed by a fast Fourier transform method) in fluorobenzene at a concentration of about 1.0 weight % was coated on the stripe pattern of the substrate to a thickness of about 40 nm and a membrane comprising the self-assembled block copolymer was formed through thermal annealing at about 230° C. for 5 minutes.

COMPARATIVE EXAMPLE 1

A stripe pattern was formed and a self-assembled lamella pattern of the block copolymer was formed, in the same manner as in Example 1, except that the polymer (E) of Preparation Example 5 was used as the first polymer in place of the random copolymer (B) of Preparation Example 2, and the annealing temperature of the polymer (E) was changed to 160° C. upon manufacturing the stripe pattern.

FIG. 7 is the result for the self-assembled block copolymer membrane identified in Example 1, and FIG. 8 is the result for the self-assembled block copolymer membrane identified in Comparative Example 1.

From the comparison of FIGS. 7 and 8, it can be confirmed that, in the case of the comparative example 1, a considerable number of defects occurred as compared to Example 1.

The invention claimed is:

1. A laminate, comprising:
a substrate; and
a stripe pattern having first and second polymer lines alternately and repeatedly disposed on the substrate; and
a polymer membrane disposed on the stripe pattern and having a self-assembled block copolymer,
wherein the first polymer line comprises a first polymer having a first polymerized unit having a ring structure connected to a main chain and a second polymerized unit represented by Formula 1 below, and
wherein the second polymer line comprises a second polymer different from the first polymer:

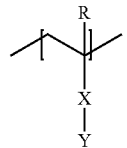

[Formula 1]

wherein, R is hydrogen or an alkyl group, X is a single bond, an oxygen atom, a sulfur atom, —S(=O)$_2$—, a carbonyl group, an alkylene group, an alkenylene group, an alkynylene group, —C(=O)—X$_1$—or —X$_1$—C(=O)—, where Xi is an oxygen atom, a sulfur atom, —S(=O)$_2$—, an alkylene group, an alkenylene group, an alkynylene group or an oxyalkylene group, and Y is a crosslinkable functional group or the crosslinkable functional group in a state of reacting with the substrate.

2. The laminate according to claim 1, wherein the ring structure of the first polymerized unit is directly connected to the main chain or is connected thereto via a linker.

3. The laminate according to claim 1, wherein the ring structure of the first polymerized unit comprises one or more halogen atoms.

4. The laminate according to claim 1, wherein a chain having 8 or more chain-forming atoms is connected to the ring structure of the first polymerized unit.

5. The laminate according to claim 1, wherein the first polymerized unit is represented by Formula 2 below:

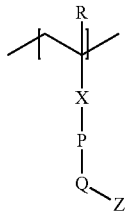

[Formula 2]

wherein, R is hydrogen or an alkyl group having 1 to 4 carbon atoms, X is an oxygen atom, a sulfur atom, —S(=O)$_2$—, a carbonyl group, —C(=O)—O— or —O—C(=O)—, P is an arylene group having 6 to 18 carbon atoms, Q is a single bond, an oxygen atom, a sulfur atom, —S(=O)$_2$—, a carbonyl group, —C(=O)—O— or —O—C(=O)—, and Z is a hydrocarbon chain having 8 to 20 carbon atoms.

6. The laminate according to claim 1, wherein the first polymerized unit is represented by Formula 3 below:

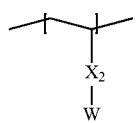

[Formula 3]

wherein, X$_2$ is a single bond, an oxygen atom or a sulfur atom, and W is an aryl group having 6 to 18 carbon atoms and containing 3 or more halogen atoms.

7. The laminate according to claim 1, wherein the crosslinkable functional group of the second polymerized unit is a hydroxyl group, a hydroxyalkyl group, an epoxy group, a glycidyl group, a glycidoxyalkyl group, a silane group or a carboxyl group.

8. The laminate according to claim 1, wherein the first polymer comprises the first polymerized unit in an amount of 50 mol % or more.

9. The laminate according to claim 8, wherein the second polymerized unit is contained in the first polymer in a ratio that 0.4 mol to 10 mol is present per 100 mol of the first polymerized unit.

10. The laminate according to claim 1, wherein the first polymer has no crosslinkable functional group at a terminal end thereof.

11. The laminate according to claim 1, wherein the second polymer is a random copolymer comprising a first polymerized unit having a first ring structure connected to the main chain and including one or more halogen atoms, and a second polymerized unit having a second ring structure connected to the main chain, wherein a chain having 8 or more chain-forming atoms is connected to the second ring structure.

12. The laminate according to claim 1, wherein the block copolymer comprises a first block having a unit of Formula 4 below and a second block having a unit of Formula 5 below:

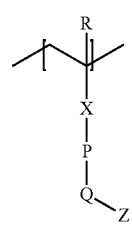

[Formula 4]

wherein, R is hydrogen or an alkyl group having 1 to 4 carbon atoms, X is an oxygen atom, a sulfur atom, —S(=O)$_2$—, a carbonyl group, —C(=O)—O— or —O—C(=O)—, P is an arylene group having 6 to 18 carbon atoms, Q is a single bond, an oxygen atom, a sulfur atom, —S(=O)$_2$—, a carbonyl group, —C(=O)—O— or —O—C(=O)—, and Z is a hydrocarbon chain having 8 to 20 carbon atoms:

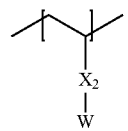

[Formula 5]

wherein, X$_2$ is a single bond, an oxygen atom or a sulfur atom, and W is an aryl group having 6 to 18 carbon atoms and containing 3 or more halogen atoms.

13. A method for producing a patterned substrate, comprising:
forming a self-assembled structure of a block copolymer comprising a first block having a unit of Formula 4 below and a second block having a unit of Formula 5 below on the stripe pattern of the laminate of claim 1:

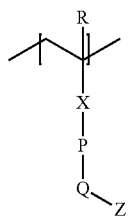

[Formula 4]

wherein, R is hydrogen or an alkyl group having 1 to 4 carbon atoms, X is an oxygen atom, a sulfur atom, —S(=O)$_2$—, a carbonyl group, —C(=O)—O— or —O—C(=O)—, P is an arylene group having 6 to 18 carbon atoms, Q is a single bond, an oxygen atom, a sulfur atom, —S(=O)$_2$—, a carbonyl group, —C(=O)—O— or —O—C(=O)—, and Z is a hydrocarbon chain having 8 to 20 carbon atoms:

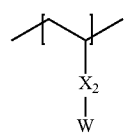

[Formula 5]

wherein, X$_2$ is a single bond, an oxygen atom or a sulfur atom, and W is an aryl group having 6 to 18 carbon atoms and containing 3 or more halogen atoms.

14. The method for producing a patterned substrate according to claim 13, further comprising:
selectively removing any one block of the first and second blocks of the block copolymer from the self-assembled structure to form a mask; and
etching the substrate through the mask.

* * * * *